(12) United States Patent
Weber et al.

(10) Patent No.: US 10,965,444 B2
(45) Date of Patent: *Mar. 30, 2021

(54) MITIGATING TIMING ATTACKS VIA DYNAMICALLY TRIGGERED TIME DILATION

(71) Applicant: Microsoft Technology Licensing, LLC, Redmond, WA (US)

(72) Inventors: Jason Weber, Medina, WA (US); Tobin Titus, Kirkland, WA (US); Daniel Libby, Kirkland, WA (US); Brian Manthos, Bellevue, WA (US); Colin Pacitti, Seattle, WA (US); Pengxiang Zhao, Bellevue, WA (US); Matthew Miller, Seattle, WA (US); Jordan Thomas Rabet, Seattle, WA (US); John Hazen, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 261 days.

This patent is subject to a terminal disclaimer.

(21) Appl. No.: 15/961,830

(22) Filed: Apr. 24, 2018

(65) Prior Publication Data

US 2019/0327075 A1    Oct. 24, 2019

(51) Int. Cl.
*H04L 9/00* (2006.01)

(52) U.S. Cl.
CPC ...... *H04L 9/005* (2013.01); *G06F 2207/7223* (2013.01); *H04L 2209/046* (2013.01); *H04L 2209/08* (2013.01); *H04L 2209/122* (2013.01)

(58) Field of Classification Search
CPC .............. H04L 9/005; H04L 2209/122; H04L 2209/046; H04L 2209/08; G06F 2207/7223
See application file for complete search history.

(56) References Cited

U.S. PATENT DOCUMENTS

| 8,719,925 | B1 | 5/2014 | Berg |
| 8,775,564 | B1 | 7/2014 | Smart et al. |

(Continued)

FOREIGN PATENT DOCUMENTS

| WO | 2013172913 A2 | 11/2013 | |
| WO | WO2013172913 | * 11/2013 | ........... G06F 21/556 |
| WO | 2014065801 A1 | 5/2014 | |

OTHER PUBLICATIONS

Acm 2670940—StopWatch: A Cloud Architecture for Timing Channel Mitigation, ACM Transactions on Information and System Security, vol. 17, No. 2, Article 8, Publication date: Nov. 2014 (Year: 2014).*

(Continued)

*Primary Examiner* — Ali S Abyaneh
*Assistant Examiner* — Shu Chun Gao
(74) *Attorney, Agent, or Firm* — Fountainhead Law Group P.C.

(57) ABSTRACT

Techniques for mitigating timing attacks via dynamically triggered time dilation are provided. According to one set of embodiments, a computer system can track a count of application programming interface (API) calls or callbacks made by a program within each of a series of time buckets. The computer system can further determine that the count exceeds a threshold count for a predefined consecutive number of time buckets. Upon making this determination, the computer system can trigger time dilation with respect to the program, where the time dilation causes the program to observe a dilated view of time relative to real time.

20 Claims, 6 Drawing Sheets

(56) References Cited

U.S. PATENT DOCUMENTS

| | | | |
|---|---|---|---|
| 8,813,240 | B1 | 8/2014 | Northup |
| 10,210,335 | B2 | 2/2019 | Madou et al. |
| 10,509,714 | B2 | 12/2019 | Ikeda et al. |
| 2003/0158854 | A1 | 8/2003 | Yoshida et al. |
| 2005/0050324 | A1 | 3/2005 | Corbett et al. |
| 2005/0213761 | A1 | 9/2005 | Walmsley et al. |
| 2010/0131936 | A1 | 5/2010 | Cheriton |
| 2010/0146085 | A1* | 6/2010 | Van Wie ............ H04L 67/1059 709/220 |
| 2012/0185700 | A1 | 7/2012 | Vidrine et al. |
| 2012/0192283 | A1 | 7/2012 | Gu et al. |
| 2013/0298236 | A1 | 11/2013 | Smith et al. |
| 2013/0326625 | A1 | 12/2013 | Anderson et al. |
| 2014/0123139 | A1 | 5/2014 | Fine et al. |
| 2014/0282464 | A1 | 9/2014 | El-gillani |
| 2014/0380474 | A1* | 12/2014 | Paithane ............... H04L 63/145 726/23 |
| 2015/0067853 | A1 | 3/2015 | Amrutkar et al. |
| 2015/0082434 | A1 | 3/2015 | Sethumadhavan et al. |
| 2016/0014076 | A1 | 1/2016 | Hansen |
| 2016/0014084 | A1 | 1/2016 | Hansen |
| 2016/0218721 | A1 | 7/2016 | Herbeck |
| 2018/0048660 | A1 | 2/2018 | Paithane et al. |
| 2018/0068115 | A1* | 3/2018 | Golovkin ................ G06F 21/53 |
| 2018/0157827 | A1 | 6/2018 | Kang et al. |
| 2018/0247069 | A1 | 8/2018 | Tang et al. |
| 2018/0323960 | A1 | 11/2018 | Courtney |
| 2019/0073665 | A1 | 3/2019 | Belleville et al. |
| 2019/0108330 | A1 | 4/2019 | Sikder et al. |
| 2019/0190694 | A1 | 6/2019 | Joye et al. |
| 2019/0243990 | A1 | 8/2019 | Wei et al. |
| 2019/0325132 | A1 | 10/2019 | Manthos et al. |
| 2019/0327076 | A1 | 10/2019 | Weber et al. |

OTHER PUBLICATIONS

"Address space layout randomization", Retrieved From https://en.wikipedia.org/wiki/Address_space_layout_randomization, Retrieved on: Feb. 12, 2018, 8 Pages.
Gras, et al., "ASLR on the Line: Practical Cache Attacks on the MMU", In Proceedings of Network and Distributed System Security Symposium, Feb. 26, 2017, pp. 1-15.
"High Resolution Time Level 2", Retrieved From http://www.w3.org/TR/hr-time-2/, Mar. 1, 2018, 11 Pages.
"Interpolation", Retrieved From https://en.wikipedia.org/wiki/Interpolation, Retrieved on: Feb. 12, 2018, 6 Pages.
"Observer (special relativity)", Retrieved From https://en.wikipedia.org/wiki/Observer_(special_relativity), Retrieved on: Feb. 12, 2018, 3 Pages.
"Secure Systems", Retrieved From https://www.iaik.tugraz.at/content/research/sesys/, Retrieved on: Feb. 12, 2018, 1 Page.
"Security: SVG Filter Timing Attack", Retrieved From https://bugs.chromium.org/p/chromium/issues/detail?id=251711, Jun. 19, 2013, 6 Pages.
"Speculative execution", Retrieved From https://en.wikipedia.org/wiki/Speculative_execution, Retrieved on: Feb. 12, 2018, 4 Pages.
"Theory of relativity", Retrieved From https://en.wikipedia.org/wiki/Theory_of_relativity, Retrieved on: Feb. 12, 2018, 6 Pages.
"Time dilation", Retrieved From https://www.britannica.com/science/time-dilation, Retrieved on: Feb. 12, 2018, 4 Pages.
"Velocity", Retrieved From https://en.wikipedia.org/wiki/Velocity, Retrieved on: Feb. 12, 2018, 7 Pages.
Kohlbrenne, et al., "Trusted Browsers for Uncertain Times", https://cseweb.ucsd.edu/~dkohlbre/papers/uncertaintimes-slides.pdf, Retrieved on: Feb. 12, 2018, 85 Pages.
Kohlbrenner, et al., "Trusted Browsers for Uncertain Times", In Proceedings of the 25th USENIX Security Symposium, Aug. 10, 2016, pp. 463-480.
Schwarz, et al., "Fantastic Timers and Where to Find Them: High-Resolution Microarchitectural Attacks in JavaScript", In Proceedings of International Conference on Financial Cryptography and Data Security, Apr. 3, 2017, pp. 1-21.
Schwarz, et al., "JavaScript Zero: Real JavaScript and Zero Side-Channel Attacks", In Proceedings of Network and Distributed System Security Symposium, Feb. 18, 2018, pp. 1-15.
"Non Final Office Action Issued in U.S. Appl. No. 15/961,849", dated Feb. 6, 2020, 18 Pages.
"Non Final Office Action Issued in U.S. Appl. No. 15/980,648", dated Jan. 24, 2020, 21 Pages.
"Notice of Allowance Issued in U.S. Appl. No. 15/961,849", dated May 14, 2020, 12 Pages.
Checkoway, et al., "Return-Oriented Programming without Returns", In Proceedings of the 17th ACM Conference on Computer and Communications Security, Oct. 4, 2010, pp. 559-572.
Hartel, et al., "Classification of APIs by Hierarchical Clustering", In Proceedings of the 26th International Conference on Program Comprehension, May 27, 2018, pp. 233-243.
Ostrovsky, et al., "Optimal and Efficient Clock Synchronization Under Drifting Clocks", In Proceedings of the 18th Annual ACM Symposium on Principles of Distributed Computing, May 1, 1999, pp. 3-12.
Askarov, et al., "Predictive Black-Box Mitigation of Timing Channels", In Proceedings of the 17th ACM Conference on Computer and Communications Security, Oct. 4, 2010, pp. 297-307.
"International Search Report & Written Opinion Issued in PCT Patent Application No. PCT/US2019/026213", dated Jul. 8, 2019, 11 Pages.
"International Search Report and Written Opinion Issued in PCT Patent Application No. PCT/US2019/026232", dated Jul. 8, 2019, 10 Pages.
"Final Office Action Issued in U.S. Appl. No. 15/980,648", dated Jul. 6, 2020, 18 Pages.
"Notice of Allowance Issued in U.S. Appl. No. 15/980,648", dated Jan. 25, 2021, 15 Pages
Carrega, et al., "Data Log Management for Cyber-Security Programmability of Cloud Services and Applications", In Proceedings of the 1st ACM Workshop on Workshop on Cyber-Security Arms Race, Nov. 15, 2019, pp. 47-52.
Jenkins, et al., "Ghostbusting: Mitigating Spectre with Intraprocess Memory Isolation", In Proceedings of the 7th Symposium on Hot Topics in the Science of Security, Sep. 21, 2020, 11 Pages.

* cited by examiner

MITIGATING TIMING ATTACKS VIA DYNAMICALLY TRIGGERED TIME DILATION

CROSS-REFERENCES TO RELATED APPLICATIONS

The present application is related to commonly-owned U.S. patent application Ser. No. 15/961,849, now U.S. Pat. No. 10,785,017, entitled "Mitigating Timing Attacks via Dynamically Scaled Time Dilation," which is filed concurrently herewith. The entire contents of this related application are incorporated herein by reference for all purposes.

BACKGROUND

In computing, a timing attack is a type of side-channel attack (i.e., an attack based on information gained from the physical implementation of a computer system) in which an attacker attempts to compromise the system by analyzing the amount of time it takes to complete one or more operations. Every logical operation in a computer system takes some time to execute, and that time can differ based on the input(s) to the operation. Accordingly, with sufficiently precise measurements of an operation's execution time, an attacker can create a time model for the operation and deduce its input(s) (which may include a secret). Recent highly publicized security vulnerabilities that rely on timing attacks include the Meltdown and Spectre vulnerabilities which affect most modern microprocessor architectures.

Generally speaking, to carry out a timing attack, an attacker needs to be able to quantify an operation's execution time via a reference clock—in other words, a clock in which clock ticks arrive at a consistent rate. The attacker may establish the reference clock by consulting an explicit clock (i.e., one that is derived from hardware signals and typically represented in either wall clock time or CPU time). For example, the attacker may call an application programming interface (API) that returns timestamp values as determined by the system hardware. The attacker may also establish the reference clock by creating an implicit clock (i.e., one that is derived from an arbitrary unit of time measure, without need for an explicit clock). For example, the attacker may track the number of times it can take some action or carry out some task (e.g., call an API, run a calculation, etc.) while an operation executes and use that number to quantify the duration of the operation.

There are a number of existing approaches for mitigating timing attacks, such as clamping explicit clocks to a relatively low resolution, altering runtime hardware frequencies, and adding noise or interference to such frequencies. However, these existing approaches can be worked around and thus fail to structurally prevent timing exploits. Additionally, since these existing approaches cause a computer system to deviate from ideal operating conditions, they negatively impact the experience of users interacting with the system (e.g., performance becomes worse, resource usage increases, power efficiency decreases, etc.).

SUMMARY

Techniques for mitigating timing attacks via dynamically triggered time dilation are provided. According to one set of embodiments, a computer system can track a count of API calls or callbacks made by a program within each of a series of time buckets. The computer system can further determine that the count exceeds a threshold count for a predefined consecutive number of time buckets. Upon making this determination, the computer system can trigger time dilation with respect to the program, where the time dilation causes the program to observe a dilated view of time relative to real time.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for mitigating timing attacks via "time dilation"—in other words, dilating or warping the view of time of an observer (e.g., a potential attacker) relative to real time such that the observer cannot, or finds it very difficult to, establish a consistent reference clock for carrying out a timing attack.

According to a first set of embodiments, a computer system can track the number of API calls and/or callbacks made by an observer within each of a series of time windows, referred to as buckets. The API calls/callbacks may be explicit clock APIs and/or APIs that can be used to construct implicit clocks. If the system determines that the observer has exceeded a threshold number of API calls/callbacks for a predefined consecutive number of buckets, the system can dynamic trigger (i.e., turn-on) time dilation with respect to that observer. This can include, e.g., (1) injecting a random amount of wait time (i.e., pausing) into the implicit clock API calls/callbacks called by the observer, thereby preventing the observer from constructing a consistent implicit clock from those calls/callbacks, and/or (2) randomly jittering/warping the time values returned by explicit clock APIs to the observer, thereby preventing the observer from using those explicit clock APIs establish a consistent view of real time.

According to a second set of embodiments, the computer system can dynamically scale the amount of time dilation that is introduced via (1) and (2) for the observer based on the observer's continued behavior/activity. For example, if the observer continues to act "badly" (e.g., issue a high number of API calls/callbacks over an extended period of time) which indicates that the observer is likely perpetrating a timing attack or continuing to perpetrate such an attack, the system may increase the amount of wait time injected into implicit clock API calls/callbacks called by the observer and/or increase the amount of jitter/warping of time values returned by explicit clock APIs to the observer. Conversely, if the observer's behavior improves (e.g., reduces its call/callback activity to a normal level for an extended period of time), the time dilation introduced via the wait time injection and explicit clock jittering/warping may be dialed back or even turned off entirely.

With the two high-level concepts described above (dynamic triggering and dynamic scaling of time dilation), the observer can run under ideal conditions, with no significant delay relative to real time, as long as the observer is well-behaved. However, as soon as the observer begins to exhibit behavior that is indicative of a timing attack, the system can introduce time dilation safeguards that prevent the observer from establishing a consistent reference clock via either implicit clocks or explicit clocks. Further, as the observer becomes more or less aggressive in its activity/behavior, the system can dynamically increase or decrease the degree of time dilation as appropriate. In this way, these techniques can mitigate timing attacks in a manner that is more intelligent, efficient, and performant than existing solutions.

The foregoing and other aspects of the present disclosure are described in further detail in the sections that follow. For purposes of illustration, the embodiments and examples below are presented in the context of a web platform application (e.g., a web browser) that runs JavaScript code downloaded by the application. In these examples/embodiments, the JavaScript code is the observer/potential perpetrator of timing attacks and the web platform application is the entity that implements the techniques of the present disclosure. This is a valuable use case to consider, since JavaScript and web content in general is typically the most common vector by which unknown, potentially malicious code can reach end-user systems. However, it should be appreciated the present disclosure is not solely limited to this context and can be applied to other contexts in which timing attack mitigations are useful and appropriate. By way of example, the techniques described herein are equally applicable for mitigating timing attacks in system-level software.

2. Software Environment

Figure 1:
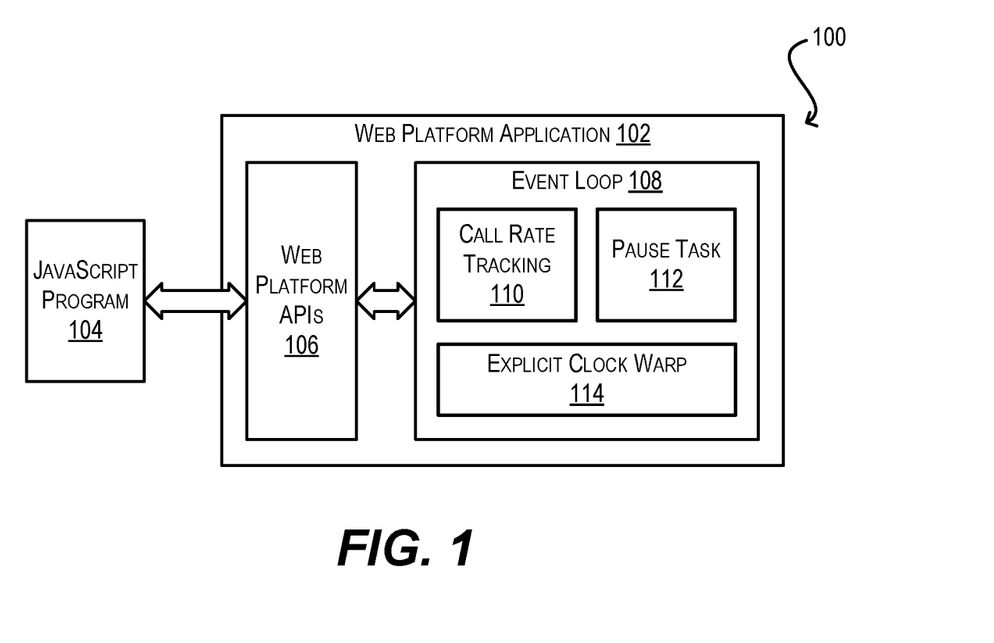
FIG. 1 depicts a simplified block diagram of a software environment that implements the techniques of the present disclosure.

FIG. 1 is a simplified block diagram of a software environment 100 in which embodiments of the present disclosure may be implemented. As shown, software environment 100 includes a web platform application 102, which may be a web browser or any other software application that hosts/presents web content, and a JavaScript program 104 that is downloaded and run by application 102. Web platform application 102 includes a set of web platform APIs 106 that can be invoked by JavaScript program 104. Examples of such APIs include standard JavaScript APIs (including callback functions such as setTimeout( ) setInterval( ) etc.), Document Object Model (DOM) APIs, HTML5 APIs, browser-specific APIs, and so on.

Web platform application 102 also includes an event loop 108 that adheres to the HTML5 event loop standard and is generally responsible for coordinating the execution of different processes within web platform application 102, including JavaScript program 104. In one set of embodiments, event loop 108 can execute code each time a given API 106 is invoked by JavaScript program 104 and thus can act as a "chokepoint" for all such API invocations.

As alluded to in the Background section, the mitigation of timing attacks is becoming an increasingly important issue with the emergence of far-reaching security vulnerabilities such as Meltdown and Spectre. JavaScript code, such as JavaScript program 104 of FIG. 1, is perhaps one of the most common vectors by which malicious code capable of perpetrating a timing attack can find its way onto end-user systems. For instance, JavaScript program 104 may be surreptitiously injected into an online advertisement that is then disseminated across a number of different websites via an ad network. Accordingly, it is desirable to have mitigations at the web platform level that prevent or make it difficult for JavaScript program 104 to carry out a timing attack.

Unfortunately, existing approaches to timing attack mitigation suffer from various limitations and disadvantages that make them less than ideal solutions for this use case. For examples, approaches that simply clamp explicit clocks to a coarse granularity or modify runtime frequencies introduce performance and power management problems that negatively affect the user experience of end-users interacting with the web platform (e.g., animations begin to stutter, UI responsiveness degrades, web pages are slow to load, etc.). These problems are particularly acute on mobile devices which depend on efficient resource usage and power management for day-long operation.

To address the foregoing and other similar issues, web platform application 102 of FIG. 1 is enhanced to include, within event loop 108, a call rate tracking module 110, a pause task module 112, and an explicit clock warp module 114. At a high level, modules 110-114 can interoperate to implement two novel timing attack mitigation mechanisms according to embodiments of the present disclosure: (1) dynamically triggered time dilation and (2) dynamically scaled time dilation.

With respect to mechanism (1) (described in further detail in section (3) below), call rate tracking module 110 can track the number of calls made by JavaScript program 104 to web platform APIs 106 that enable program 104 to construct an implicit clock (e.g., callback functions) and/or consult an explicit clock (e.g., timestamp APIs). Note that this is possible because event loop 108 acts as a chokepoint for all of the API invocations made by JavaScript program 104 and other processes of web platform application 102. Call rate tracking module 110 can perform this tracking on a per-bucket basis, where each bucket is a time window of a predefined period (e.g., 200 milliseconds), and can compare the number of calls/callbacks made within each bucket to a threshold. If call rate tracking module 110 determines that the threshold has been exceeded for a certain number of consecutive buckets, event loop 108 can trigger time dilation for JavaScript program 104 by inserting wait time into each implicit clock API call/callback via pause task module 112, and/or warping the time values returned by explicit clock APIs via explicit clock warp module 114. The end result of this is that JavaScript program 104 begins to observe a dilated view of time that is inconsistent with real time, and thus makes it difficult or impossible for program 104 to construct a consistent reference clock in order to perpetrate a timing attack.

Significantly, since the wait time insertion and explicit clock warping is only turned-on in scenarios where JavaScript program 104 is deemed to be a potential attacker (via the bucket-based call tracking above), this approach does not introduce any performance or resource usage overhead for web content that is well-behaved. This is a significant advantage over existing mitigation techniques, which tend to turn-on heavy-handed mitigations by default and thus introduce performance/power problems for all web pages, whether good or bad.

With respect to mechanism (2) (described in further detail in section (5) below), call rate tracking module 110 can continue to track the number of calls/callbacks made by JavaScript program 104 to web platform APIs 106 on a per-bucket basis once time dilation is turned on (either via the dynamic triggering mechanism of (1) or via a static configuration). Based on this continued tracking, call rate tracking module 110 can apply one or more policies to determine whether JavaScript program 104 is becoming more or less aggressive in its API calling behavior (indicating that the program is likely continuing to, or is no longer or perhaps never was, attempting to perpetrate a timing attack). This, in turn, can cause the system to scale up or down the degree of time dilation for JavaScript program 104 (via pause task module 112 and explicit clock warp module 114) in a proportional way. For example, if JavaScript program 104 continues to call implicit or explicit clock-related APIs at a high frequency for an extended period of time, the system can conclude that program 104 is continuing to perpetrate a timing attack and can ramp up the amount of wait time inserted into each implicit clock-related API call/callback, and/or the amount of warping applied to explicit clock time values. This ramping-up process can continue as long as JavaScript program 104 persists in its bad behavior, and may ultimately cause program 104 to be terminated.

Conversely, if the API call/callback rate of JavaScript program 104 drops to a low or normal level for an extended period of time, event loop 108 can conclude that program 104 is now well-behaved and can begin ramping down the amount of wait time inserted into each implicit clock-related API call/callback, and/or the amount of warping applied to explicit clock time values. This ramping-down process can continue as long as JavaScript program 104 persists in its good behavior, and may ultimately cause time dilation to be turned off entirely for program 104.

Thus, with mechanism (2), web platform application 102 can more intelligently apply its timing attack mitigations in a manner that is proportional and responsive to the real-time activity/behavior of JavaScript program 104.

It should be appreciated that software environment 100 of FIG. 1 is illustrative and not intended to limit embodiments of the present disclosure. For example, while the various entities shown in this figure are arranged according to a particular configuration, other configurations are also possible. Further, these entities may include various subcomponents and/or functions that are not specifically described. One of ordinary skill in the art will recognize other variations, modifications, and alternatives.

3. Dynamically Triggering Time Dilation

Figure 2:
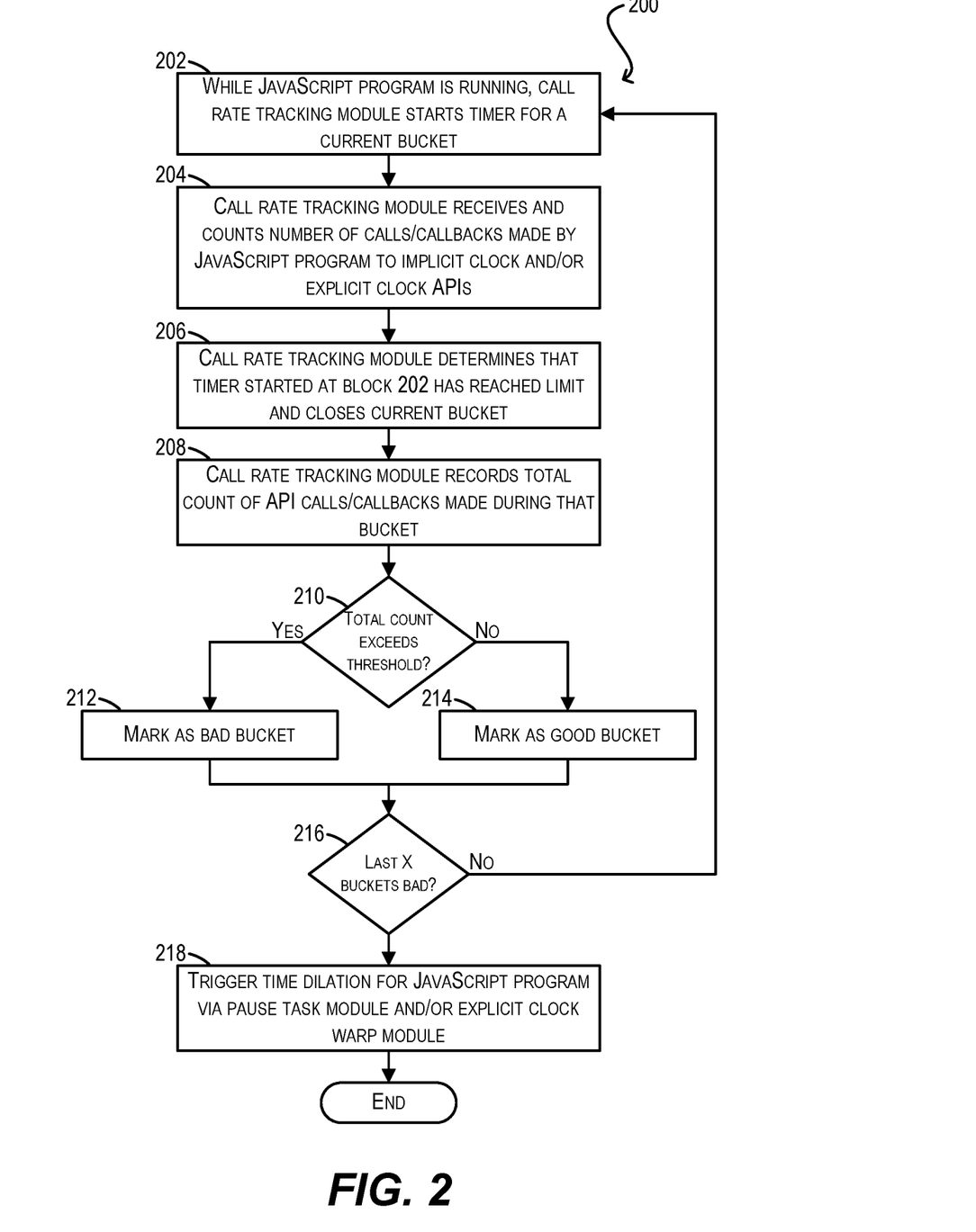
FIG. 2 depicts a workflow for dynamically triggering time dilation according to certain embodiments.

FIG. 2 depicts a workflow 200 that provides additional details regarding the processing that may be performed by web platform application 102 and its constituent components (e.g., call rate tracking module 110, pause task module 112, explicit clock warp module 114) for dynamically triggering time dilation with respect to JavaScript program 104 according to certain embodiments.

At block 202, while JavaScript program 104 is running, call rate tracking module 110 can start a timer for a current bucket (i.e., time window). At block 204, call rate tracking module 110 can receive and count the number of calls/callbacks made by JavaScript program 104 to web platform APIs 106 that either enable program 104 to construct an implicit clock (i.e., a clock based on an arbitrary, internal unit of time measure) or consult an explicit clock (i.e., a clock that is based on hardware signals and represented as, e.g., wall clock time or CPU time). Examples of the former include JavaScript API calls or callbacks such as setTimeout( ) and setInterval( ) Examples of the latter include any API that returns a hardware-derived timestamp or time value.

At block 206, call rate tracking module 110 can determine that the timer started at block 202 has reached a predefined time limit (e.g., 200 milliseconds) and close the current bucket. In addition, module 110 can record the total number of API calls/callbacks counted during that bucket (block 208) and check whether the total number exceeds a predefined threshold (block 210). If so, call rate tracking module 110 can mark the bucket as a "bad" bucket (block 212). Otherwise, call rate tracking module 110 can mark the bucket as a "good" bucket (block 214).

Once call rate tracking module 110 has marked the bucket appropriately, module 110 can check whether the last X consecutive buckets were bad buckets, where X is some predefined number (block 216). If not, call rate tracking module 110 can return to block 202 in order to start a timer for a new bucket and repeat the preceding steps.

However, if the last X consecutive buckets were in fact bad buckets, it can be concluded that JavaScript program 104 is exhibiting bad behavior that is indicative of a timing attack. As a result, web platform application 102 can trigger (i.e., turn-on) time dilation with respect to JavaScript program 104 by leveraging pause task module 112 and/or explicit clock warp module 114 (block 218).

For example, according to one set of embodiments, for each successive call that JavaScript program 104 makes to an API function or callback that relates to implicit clock creation, event loop 108 can (via, e.g., a task scheduler) instruct pause task module 112 to insert a randomly generated amount of wait time into the API execution flow, before the call/callback returns to program 104. The result of this is that the API never completes in a consistent amount of time from the perspective of JavaScript program 104, which makes it difficult or impossible for program 104 to count instances of these API calls/callbacks to construct an implicit clock. In a particular embodiment, the amount of wait time that pause task module 112 inserts into each API call/callback can be a random value from 0 to 255 microseconds.

According to another set of embodiments, for each successive call that JavaScript program 104 makes to an API function that relates to an explicit clock, event loop 108 can (via, e.g., a task scheduler) instruct explicit clock warp module 114 to randomly dilate or warp the time value that is returned by the API to program 104. The result of this is that JavaScript program 104 never receives a consistent view of time from these explicit clock APIs, which makes it difficult or impossible for program 104 to create a consistent reference clock based on the explicit clocks. There are different ways in which explicit clock warp module 114 can warp the time values that are generated by the explicit clock APIs, which include clamping/random jitter and applying randomly-generated linear or higher-order functions that transform real time to warped time. These various techniques are discussed in section (4) below.

According to yet other embodiments, event loop 108 can trigger any combination or subset of the time dilation techniques described above according to various policies. For example, if call rate tracking module 110 determines that JavaScript program 104 has invoked a threshold number of explicit clock APIs for X consecutive bad buckets (but not a threshold number of APIs related to implicit clocks), event loop 108 may solely trigger explicit clock warping. As another example, if call rate tracking module 110 determines that JavaScript program 104 has invoked a threshold number of APIs related to implicit clocks for X consecutive bad buckets (but not a threshold number of explicit clock APIs), event loop 108 may solely trigger wait time insertion. As yet another example, a large number of API calls/callbacks for implicit clocks may also trigger explicit clock warping, and vice versa. All of these permutations, and more, are within the scope of the present disclosure.

It should be appreciated that workflow 200 of FIG. 2 is illustrative and various modifications are possible. For example, although workflow 200 shows that a single instance of call rate tracker module 110 can track the counts of both explicit and implicit clock API calls/callbacks, in some cases two separate instances of module 110 may be used for these purposes respectively. Further, the various steps shown in workflow 200 can be sequenced differently, certain steps can be combined as needed, and certain steps can be omitted as needed. One of ordinary skill in the art will recognize other variations, modifications, and alternatives.

4. Warping Explicit Clocks

As mentioned above, at the time of determining that time dilation should be turned on with respect to JavaScript program 104, web platform application 102 can leverage explicit clock warp module 114 in order to dilate or warp the time values that are returned by explicit clocks APIs to program 104, thereby preventing program 104 from observing a consistent view of time via explicit clocks. Generally speaking, explicit clock warp module 114 can use any algorithm to transform the time values returned by the explicit clock APIs (referred to as real time) into the time values observed by JavaScript program 104 (referred to as observed time), as long as program 104's observed view of time is non-decreasing.

Figure 3A:
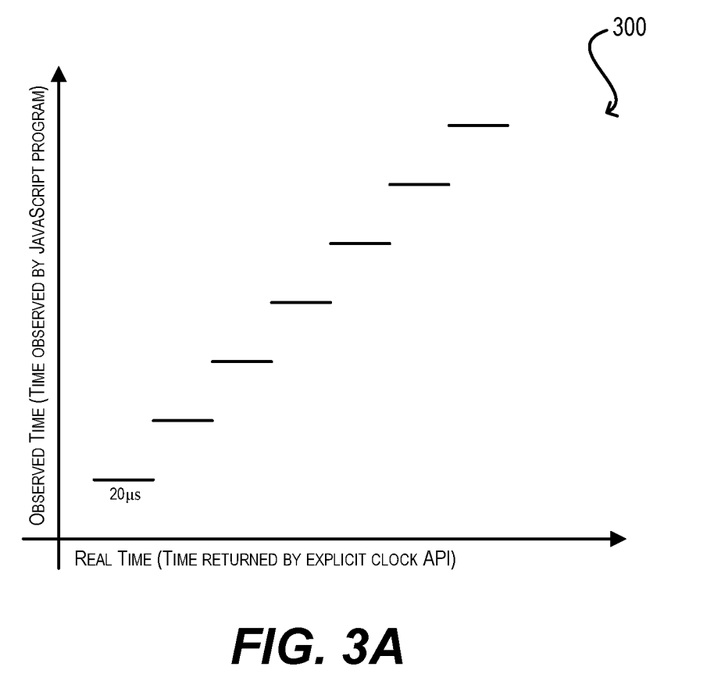
FIGS. 3A, 3B, and 3C depict graphs illustrating different algorithms for warping an explicit clock according to certain embodiments.
Figure 3B:
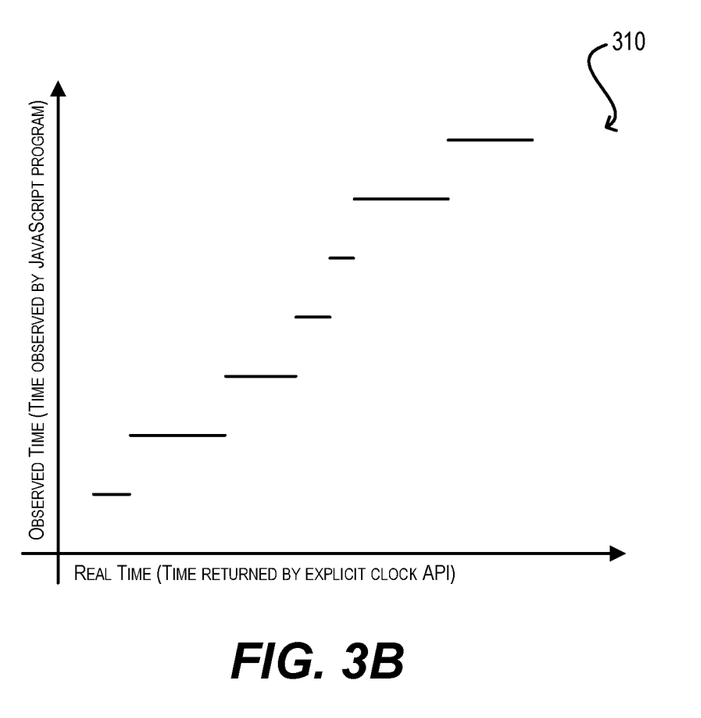

According to one set of embodiments, explicit clock warp module 114 can perform this warping by clamping the time values to a relatively coarse granularity, such as 5 or 20 microsecond intervals, and then randomly jittering the point at which a particular time value is clamped (i.e., performing the clamping at different random times within each clamping period). These concepts are visualized in FIGS. 3A and 3B according to an embodiment. In particular, FIG. 3A depicts a graph 300 with real time on the x-axis and observed time on the y-axis, where the y values (i.e., time observed by JavaScript program 104) are clamped at regular 20 microsecond intervals. FIG. 3B depicts a graph 310 where the y values are clamped, but the point at which the clamping occurs is randomly jittered. This results in clamping periods of different random lengths.

Figure 3C:
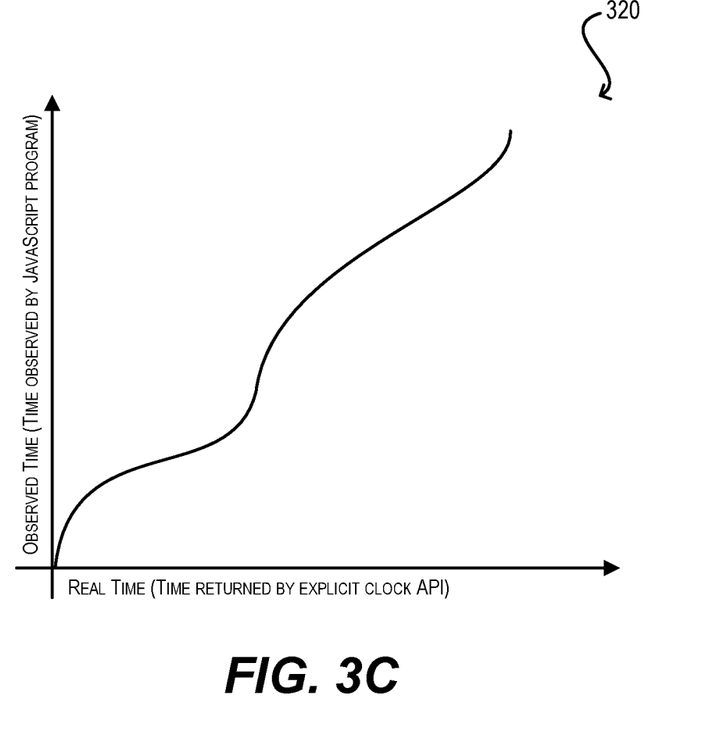

According to another set of embodiments, explicit clock warp module 114 can perform the warping by using a linear transformation function such as $y=ax+b$ where variables a and b are chosen randomly, or a nonlinear transformation function such as $y=ax^t+b$ where variables a, b, and t are chosen randomly. An example nonlinear transformation function is shown as graph 320 in FIG. 3C. One advantage of using these transformation functions over the random jitter technique is that the delay experienced by JavaScript program 104 is less variable; in the case of the transformation functions, the maximum delay will be defined by the function itself, whereas with random jittering the maximum delay may be as high as twice the clamping interval (depending upon how the clamping turnover points are randomly determined).

In various embodiments, the transformation function described above can be made as complex as needed (by, e.g., adding more variables/dimensions) in order to make it difficult for an attacker to reverse-engineer the function and determine how time is being warped. In some embodiments, multiple transformation functions may be spliced together for further security.

5. Dynamically Scaling Time Dilation

Figure 4:
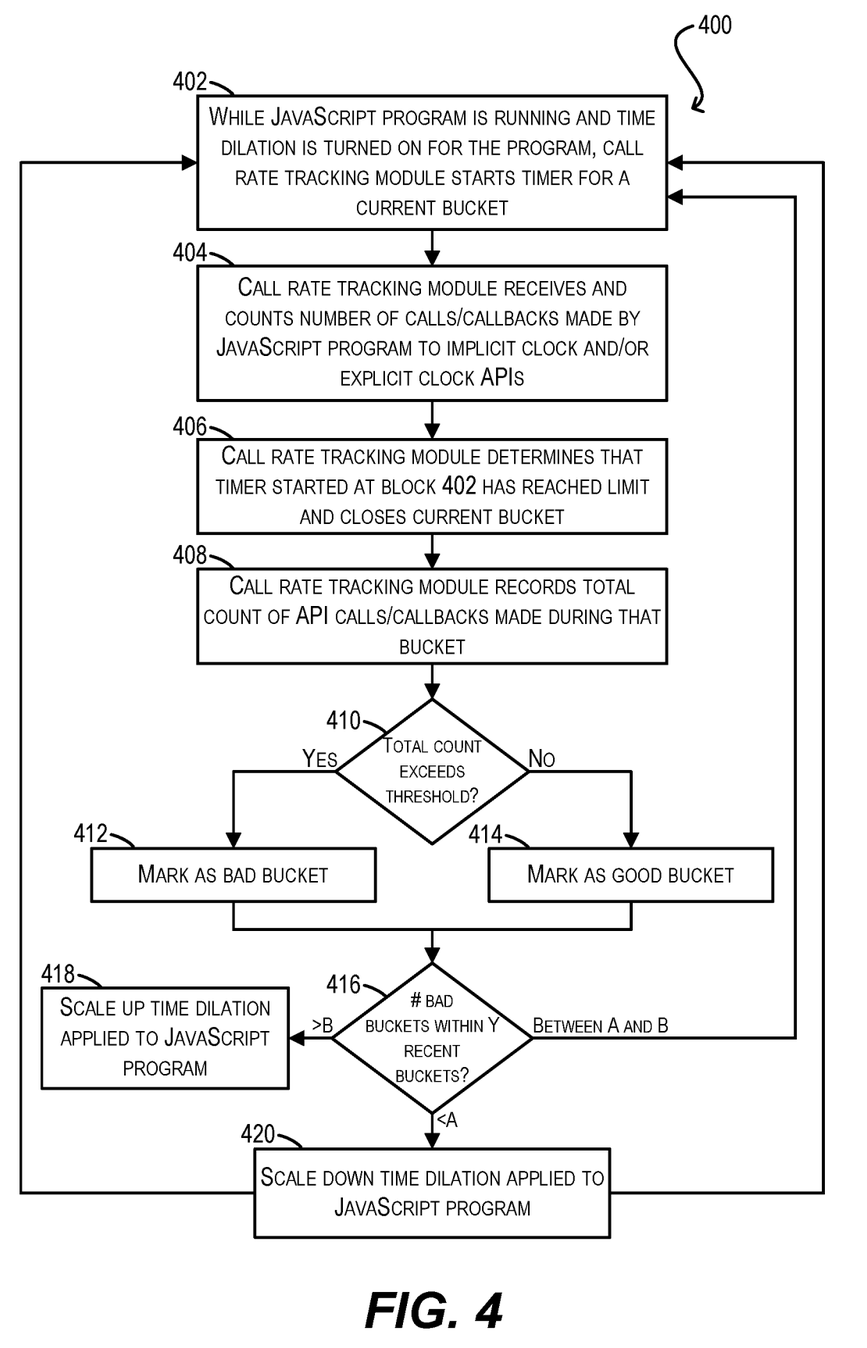
FIG. 4 depicts a workflow for dynamically scaling time dilation according to certain embodiments.

FIG. 4 depicts a workflow 400 that provides additional details regarding the processing that may be performed by web platform application 102 and its constituent components (e.g., call rate tracking module 110, pause task module 112, explicit clock warp module 114) for dynamically scaling time dilation with respect to JavaScript program 104 according to certain embodiments. Workflow 400 assumes that time dilation has already been turned on for JavaScript program 104, either by virtue of the dynamic triggering mechanism described in section (3) or via a static (e.g., default) configuration.

Blocks 402-414 of workflow 400 are substantially similar to blocks 302-314 of workflow 300. In particular, at block 402, call rate tracking module 110 can start a timer for a current bucket (i.e., time window). While this timer is running, call rate tracking module 110 can receive and count the number of calls/callbacks made by JavaScript program 104 to web platform APIs 106 that either enable program 104 to construct an implicit clock (i.e., a clock based on an arbitrary, internal unit of time measure) or consult an explicit clock (i.e., a clock that is based on hardware signals and represented as, e.g., wall clock time or CPU time) (block 404).

At block 406, call rate tracking module 110 can determine that the timer started at block 402 has reached a predefined time limit (e.g., 200 milliseconds) and close the current bucket. In addition, module 110 can record the total number of API calls/callbacks counted during that bucket (block 408) and check whether that total number exceeds a predefined threshold (block 410). If so, call rate tracking module 110 can mark the bucket as a bad bucket (block 412). Otherwise, call rate tracking module 110 can mark the bucket as a good bucket (block 414).

Once call rate tracking module 110 has marked the bucket appropriately, module 110 can check the number of bad buckets have been encountered within some range of Y recent buckets (block 416). Note that this condition is different from that used in the triggering workflow (which looks at consecutive bad buckets), since when scaling time dilation it is generally more useful to look at patterns of behavior over non-contiguous periods of time (to account for scenarios where JavaScript program 104 may temporarily halt or slow down its call rate activity in an attempt to fool mitigation mechanisms).

If the number of bad buckets encountered within the last Y buckets is between some low watermark A and some high watermark B, it can be concluded that the call rate behavior of JavaScript program 104 is about the same as before (i.e., has gotten neither better nor worse) and call rate tracking module 110 can return to block 402 in order to start a timer for a new bucket and repeat the preceding steps. Note that in this case, pause task module 112 and explicit clock warp module 114 will continue to insert wait time and warp explicit clock values for JavaScript program 104 in accordance with what they were doing before.

On the other hand, if the number of bad buckets encountered within the last Y buckets is greater than the high watermark B, it can be concluded that the call rate behavior/activity of JavaScript program 104 is increasing/getting worse. In this case, high watermark B can be incremented/increased and web platform application 102 can scale up the degree of time dilation applied to JavaScript program 104 (block 418). For example, if pause task module 112 was previously inserting a randomly generated amount of wait time into the API execution flow according to a certain range (e.g., 0 to 255 microseconds), module 112 can increase the top value of this range such that the maximum possible wait time is increased. Further, if explicit clock warp module 114 was previously warping the time values returned by explicit clock APIs to program 104 according to some clamping interval and some amount of random jitter, module 114 can increase the clamping interval and/or range of random jitter, such that the time observed by JavaScript program 104 is even further removed from real time. Call rate tracking module 110 can then return to block 402 in order to start a timer for a new bucket and repeat the preceding steps.

Finally, if the number of bad buckets encountered within the last Y buckets is less than the low watermark A, it can be concluded that the call rate behavior/activity of JavaScript program 104 is decreasing/getting better. In this case, low watermark A can be decremented/decreased and web platform application 102 can scale down the degree of time dilation applied to JavaScript program 104 (block 420). For example, if pause task module 112 was previously inserting a randomly generated amount of wait time into the API execution flow according to a certain range, module 112 can decrease the top value of this range such that the maximum possible wait time is decreased. Further, if explicit clock warp module 114 was previously warping the time values returned by explicit clock APIs to program 104 according to some clamping interval and some amount of random jitter, module 114 can decrease the clamping interval and/or range of random jitter, such that the time observed by JavaScript program 104 is less removed from real time. Call rate tracking module 110 can then return to block 402 in order to start a timer for a new bucket and repeat the preceding steps.

Generally speaking, in various embodiments, web platform application 102 can scale up or down the wait time inserted by pause task module 112 and warping performed by explicit clock warp module 114 either independently or in a combined manner according to various policies. For example, if call rate tracking module 110 detects a significant change in call rate behavior with respect to explicit clock APIs but not implicit clock APIs, application 102 may solely scale explicit clock warping. Conversely, if call rate tracking module 110 detects a significant change in call rate behavior with respect to implicit clock APIs but not explicit clock APIs, application 102 may solely scale wait time insertion. As another example, a significant change in behavior with respect to implicit clocks may also cause scaling of explicit clock warping, and vice versa. All of these permutations, and more, are within the scope of the present disclosure.

Further, although not shown in FIG. 4, in some embodiments web platform application 102 may take special measures if JavaScript program 104 behaves exceptionally well or badly over an extended period of time. For instance, if high watermark B reaches a maximum threshold (indicating that the call rate activity/behavior of JavaScript program 104 has gotten progressively worse), application 102 may simply terminate the process associated with the program rather than continuing to scale the time dilation experienced by the program any further. Similarly, if low watermark A reaches a minimum threshold (indicating that the call rate activity/behavior of JavaScript program 104 has gotten progressively better), application 102 may completely turn off time dilation for program 104. In this scenario, time dilation may be triggered again per workflow 300 if JavaScript program 104 begins exhibiting bad behavior again in the future.

6. Leveraging Telemetry

In some embodiments, web platform application 102 can include a telemetry component that enables it to communicate information regarding the time dilation performed with respect to JavaScript program 104 and other downloaded JavaScript code to one or more remote servers. Examples of such information include the web pages/URLs comprising program 104, the measured call rate activity of program 104, whether time dilation was triggered for program 104, whether time dilation was scaled for program 104, the particular parameters used for the time dilation triggering/scaling, system performance parameters when time dilation was turned on, and so on.

The servers can then aggregate this information across a large population of applications/users and determine statistics and trends which can be used for various purposes. For example, in one set of embodiments, the servers can identify a "whitelist" of web pages that are highly unlikely to contain JavaScript code that is attempting to perpetrate a timing attack, as well as a "blacklist" of web pages that are highly likely to contain such malicious JavaScript code. The whitelist and blacklist can then be communicated back to web platform application 102 (and/or to other client applications such as anti-virus/anti-malware software), which can uses these lists to, e.g., block user access to blacklisted sites, turn off time dilation by default for whitelisted sites, and/or implement more relaxed time dilation policies/parameters/rules for whitelisted sites.

As another example, the statistics determined by the remote servers can be used to inform and fine tune the time dilation triggering and scaling algorithms described above, such that they perform as expected and without unnecessary or burdensome performance penalties. For instance, the remote servers may determine that one particular algorithm used to perform explicit clock warping results in excessive stuttering on a few popular websites, which may instigate a change to a different algorithm. Further, the remote servers may determine that the scaling algorithm may cause a particular non-malicious website to crash when loaded, which may result in a modification to the scaling parameters to avoid this incompatibility. One of ordinary skill in the art will recognize other possible use cases for this collected data.

7. Example Computer System

Figure 5:
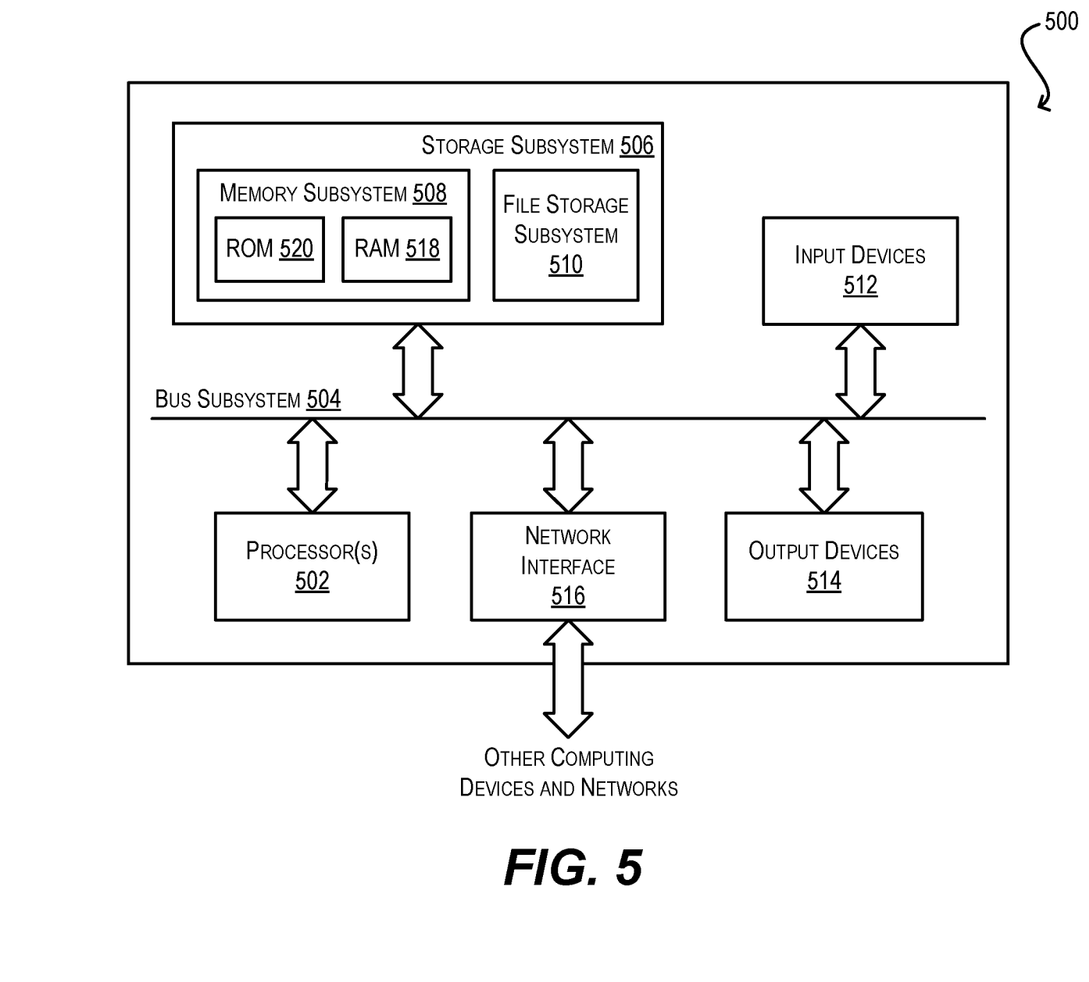
FIG. 5 depicts a simplified block diagram of a computer system according to certain embodiments.

FIG. 5 is a simplified block diagram illustrating the architecture of an example computer system 500 according to certain embodiments. Computer system 500 (and/or equivalent systems/devices) may be used to run any of the software described in the foregoing disclosure, including web platform application 102 of FIG. 1. As shown in FIG. 5, computer system 500 includes one or more processors 502 that communicate with a number of peripheral devices via a bus subsystem 504. These peripheral devices include a storage subsystem 506 (comprising a memory subsystem 508 and a file storage subsystem 510), user interface input devices 512, user interface output devices 514, and a network interface subsystem 516.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., an Ethernet module, a Wi-Fi and/or cellular connectivity module, and/or the like.

User interface input devices 512 can include a keyboard, pointing devices (e.g., mouse, trackball, touchpad, etc.), a touch-screen incorporated into a display, audio input devices (e.g., voice recognition systems, microphones, etc.), motion-based controllers, and other types of input devices. In general, use of the term "input device" is intended to include all possible types of devices and mechanisms for inputting information into computer system 500.

User interface output devices 514 can include a display subsystem and non-visual output devices such as audio output devices, etc. The display subsystem can be, e.g., a transparent or non-transparent display screen such as a liquid crystal display (LCD) or organic light-emitting diode (OLED) display that is capable of presenting 2D and/or 3D imagery. In general, use of the term "output device" is intended to include all possible types of devices and mechanisms for outputting information from computer system 500.

Storage subsystem 506 includes a memory subsystem 508 and a file/disk storage subsystem 510. Subsystems 508 and 510 represent non-transitory computer-readable storage media that can store program code and/or data that provide the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of storage media known in the art.

It should be appreciated that computer system 500 is illustrative and other configurations having more or fewer components than computer system 500 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
    a computer hardware processor; and
    a non-transitory computer readable storage medium having stored thereon program code that, when executed by the computer hardware processor, causes the computer hardware processor to:
        track a count of application programming interface (API) calls or callbacks made by a program within each of a series of time buckets;
        determine that the count exceeds a threshold count for a predefined consecutive number of time buckets; and
        upon determining that the count exceeds the threshold count for the predefined consecutive number of time buckets, trigger time dilation with respect to the program, wherein the time dilation causes the program to observe a dilated view of time relative to real time by modifying, for at least one API call or callback made by the program, an execution time or a return time value of the API call or callback.

2. The computer system of claim 1 wherein the count of API calls or callbacks include one or more calls or callbacks to APIs usable by the program for constructing an implicit clock.

3. The computer system of claim 2 wherein triggering time dilation with respect to the program comprises:
    for each successive call or callback made by the program to an API usable for constructing an implicit clock, inserting a random amount of wait time into the call or callback of the API.

4. The computer system of claim 1 wherein the count of API calls or callbacks include one or more calls to explicit clock APIs configured to return time values derived from one or more hardware signals of the computer system.

5. The computer system of claim 4 wherein triggering time dilation with respect to the program comprises:
    for each successive call made by the program to an explicit clock API, warping the time value returned by the explicit clock API before passing the time value to the program.

6. The computer system of claim 5 wherein warping the time value returned by the explicit clock API comprises:
    transforming the time value using a randomly determined linear or non-linear transformation function.

7. The computer system of claim 1 wherein the program code further causes the computer hardware processor to:
    transmit, to one or more remote servers, information pertaining to the program and the triggering of the time dilation with respect to the program, the information being useable by the one or more remote servers for tuning how the time dilation is implemented.

8. A method for mitigating timing attacks via dynamically triggered time dilation, the method comprising:
    tracking, by a computer system, a count of application programming interface (API) calls or callbacks made by a program within each of a series of time buckets;

determining, by the computer system, that the count exceeds a threshold count for a predefined consecutive number of time buckets; and upon determining that the count exceeds the threshold count for the predefined consecutive number of time buckets, triggering, by the computer system, time dilation with respect to the program, wherein the time dilation causes the program to observe a dilated view of time relative to real time by modifying, for at least one API call or callback made by the program, an execution time or a return time value of the API call or callback.

9. The method of claim 8 wherein the count of API calls or callbacks include one or more calls or callbacks to APIs usable by the program for constructing an implicit clock.

10. The method of claim 9 wherein triggering time dilation with respect to the program comprises:

for each successive call or callback made by the program to an API usable for constructing an implicit clock, inserting a random amount of wait time into the call or callback of the API.

11. The method of claim 8 wherein the count of API calls or callbacks include one or more calls to explicit clock APIs configured to return time values derived from one or more hardware signals of the computer system.

12. The method of claim 11 wherein triggering time dilation with respect to the program comprises:

for each successive call made by the program to an explicit clock API, warping the time value returned by the explicit clock API before passing the time value to the program.

13. The method of claim 12 wherein warping the time value returned by the explicit clock API comprises:

transforming the time value using a randomly determined linear or non-linear transformation function.

14. The method of claim 8 wherein the method further comprises:

transmitting, to one or more remote servers, information pertaining to the program and the triggering of the time dilation with respect to the program, the information being useable by the one or more remote servers for tuning how the time dilation is implemented.

15. A non-transitory computer readable storage medium having stored thereon program code executable by a computer system, the program code causing the computer system to:

track a count of application programming interface (API) calls or callbacks made by a program within each of a series of time buckets;

determine that the count exceeds a threshold count for a predefined consecutive number of time buckets; and upon determining that the count exceeds the threshold count for the predefined consecutive number of time buckets, trigger time dilation with respect to the program, wherein the time dilation causes the program to observe a dilated view of time relative to real time by modifying, for at least one API call or callback made by the program, an execution time or a return time value of the API call or callback.

16. The non-transitory computer readable storage medium of claim 15 wherein the count of API calls or callbacks include one or more calls or callbacks to APIs usable by the program for constructing an implicit clock.

17. The non-transitory computer readable storage medium of claim 16 wherein triggering time dilation with respect to the program comprises:

for each successive call or callback made by the program to an API usable for constructing an implicit clock, inserting a random amount of wait time into the call or callback of the API.

18. The non-transitory computer readable storage medium of claim 15 wherein the count of API calls or callbacks include one or more calls to explicit clock APIs configured to return time values derived from one or more hardware signals of the computer system.

19. The non-transitory computer readable storage medium 18 wherein triggering time dilation with respect to the program comprises:

for each successive call made by the program to an explicit clock API, warping the time value returned by the explicit clock API before passing the time value to the program.

20. The non-transitory computer readable storage medium of claim 15 wherein the program code further causes the computer system to:

transmit, to one or more remote servers, information pertaining to the program and the triggering of the time dilation with respect to the program, the information being useable by the one or more remote servers for tuning how the time dilation is implemented.

* * * * *